Jan. 5, 1954 G. G. McNAMARA, JR 2,665,017
LOADER ATTACHMENT FOR TRACTORS
Filed Aug. 27, 1948 7 Sheets-Sheet 1

Inventor:
Gordon G. McNamara, Jr.
Paul O. Pippel
Atty

Jan. 5, 1954

G. G. McNAMARA, JR 2,665,017

LOADER ATTACHMENT FOR TRACTORS

Filed Aug. 27, 1948

Inventor.
Gordon G. McNamara, Jr.
Paul O. Pippel
Atty.

Jan. 5, 1954  G. G. McNAMARA, JR  2,665,017
LOADER ATTACHMENT FOR TRACTORS
Filed Aug. 27, 1948  7 Sheets-Sheet 7

Inventor.
Gordon G. McNamara, Jr.

Patented Jan. 5, 1954

2,665,017

UNITED STATES PATENT OFFICE 2,665,017

LOADER ATTACHMENT FOR TRACTORS

Gordon G. McNamara, Jr., Chicago, Ill., assignor to International Harvester Company, a corporation of New Jersey Application August 27, 1948, Serial No. 46,431

5 Claims. (Cl. 214—140)

This invention relates to an improved loader construction of a type adapted to be connected to the front end of a tractor. More particularly, this invention relates to a loader attachment which embodies a novel principle of operation.

The prolific utilization of loader attachments for tractors has brought forth many design changes with respect to this type of implement during the past number of years. Numerous improvements have appeared on the market and all of these have endeavored to solve the problems which arose with implement attachments of the loader type. In general, these loader constructions have had many shortcomings. The cost of the loader attachment was generally considered prohibitive and the underlying difficulties occurring during the use of the implement, were not adequately solved.

The manufacture of loaders and tractors generally takes place in different manufacturing plants, which means, of course, that the tractor is built without any particular reference to loader specifications. The loader also is generally built with no particular tractor in mind since the ultimate customer may use any one of a variety of tractors. A loader, therefore, must be built sufficiently strong to handle the various duties for which it is intended regardless of the type of tractor used. On the other hand, the loader must be sufficiently light in weight so that the front end of the tractor is not overburdened with dead weight. Loaders that have usually been considered satisfactory in service have been found to exert a detrimental effect on the tractor. Most loader attachments consist of a large number of parts which result in an expensive, heavy, construction that is likely to place an undue burden on the front end of the tractor. Applicant has been aware of this problem and he has designed a loader of relatively light construction which is sufficiently strong to handle the heaviest loads to which an implement of this type is generally subjected.

It is a well-known fact that the greatest stress imposed on the front end of the tractor takes place during the initial stage of its operation. The load to be worked may be frozen or tightly packed and therefore the greatest power and stress upon the tractor is required during the "breakaway" cycle of operation. Conventional loaders are usually of the overhanging or boom type and consist of a pair of laterally spaced booms which extend outwardly in front of the tractor. At the foremost extent of the booms a working shovel is connected and the loader is raised and lowered by means of a hydraulic attachment which is generally connected to the tractor. Since the loader must lift the material to a considerable height it is also necessary that the shovel be positioned a considerable distance in front of the tractor. The disadvantage of such a construction is obvious since the load also must be carried forwardly of the tractor when it is transported to the position where it is to be dumped. During the breakaway action of a boom type loader the greatest stress is initially carried on the front ground support of the tractor. In view of the cantilever effect of the booms with respect to the tractor, detrimental breaks often result in the ground supports. The cantilever action in some cases is sufficient to overbalance the tractor so that the rear wheels are unable to exert enough driving traction to back up the tractor after the load has been removed from the pile.

It is readily apparent that the greatest amount of traction between the rear wheels of the tractor and the ground should be had during the extricating of the loader shovel from the pile and upon the transporting of the load to the place where it is to be dumped. In the boom type loader this desirable condition can never be obtained in view of the overhanging arrangement of the boom and shovel. During removal of the shovel from the load the traction on the rear wheels of the tractor is greatly reduced with a boom-type loader. During transport also it is of course obvious that the boom type of loader tends to decrease the driving traction of the rear wheels with respect to the ground. In boom type loaders therefore it is generally the practice to drive uphill into the load so that backing away of the tractor with the load is down hill.

Great difficulty with boom type loaders has also been encountered during the cycle of operation when the load is carried over the ground to a dumping position. Due to unfavorable ground conditions the overbalance cantilever action of the shovel results in slippage of the rear wheels and in many instances causes premature spillage of the load. The whole outfit is unstable and may, and often does, upset.

The above difficulties with boom type loaders are well-known and it is applicant's prime object to provide a loading attachment for a tractor that embodies a new principle of operation designed to overcome the inherent difficulties of the loaders aforementioned.

Another object is to provide a loader attachment adapted to lift a load a considerable distance above the tractor.

A still further object is to provide an improved novel linkage arrangement for a tractor loader, said linkage being arranged so that a hydraulic piston is positioned to exert its maximum lifting efficiency during the initial stage of the operation and whereupon subsequent stages of the operation the cylinder is so related to the linkage arrangement that its lifting power is greatly reduced.

Another object is to provide an inexpensive loader attachment embodying a novel cycle of operation wherein the loader shovel is initially moved vertically substantially close to the front ground supports of the tractor and whereupon the load is thereafter moved outwardly and upwardly in an arcuate path to a dumping position.

A further object is to provide a loader attachment for a tractor, said attachment including a pair of substantially parallel lifting arms operable to move a shovel substantially vertically during the initial breakaway action of the loader, said parallel lift arms being arranged to thereupon move the load upwardly and outwardly in an arcuate path with respect to the tractor.

A still further object is to provide a loader attachment including a supporting structure carried on the tractor, and a lifting frame including a pair of parallel links which are pivotally connected to a pair of pivot members in turn connected to the supporting structure, said lifting frame being adapted to be moved substantially vertically during the breakaway action of the loader, whereupon continued movement of said lifting frame operates to move the shovel upwardly and outwardly to a dumping position.

Still another object is to provide a loader attachment for a tractor, said loader attachment including a linkage arrangement whereby the shovel and the load carried thereon may be transported substantially close, low and adjacent to the front ground supports of the tractor.

Still another object is to provide an improved loader adapted to be mounted on a tractor, said tractor including a bumper cooperating with a lifting frame carried on the tractor for effectively driving a loader shovel into a load during alternating forward and rearward movement of the tractor.

These and other objects will become more readily apparent upon a reading of the specification when examined in connection with the drawings.

A tractor is generally designated by the reference character 10. The tractor 10 comprises a longitudinal body structure 11 which is supported on front ground supports or wheels 12. The tractor receives traction from a pair of rear ground wheels (not shown) which function in a conventional manner.

Figures 1, 6:
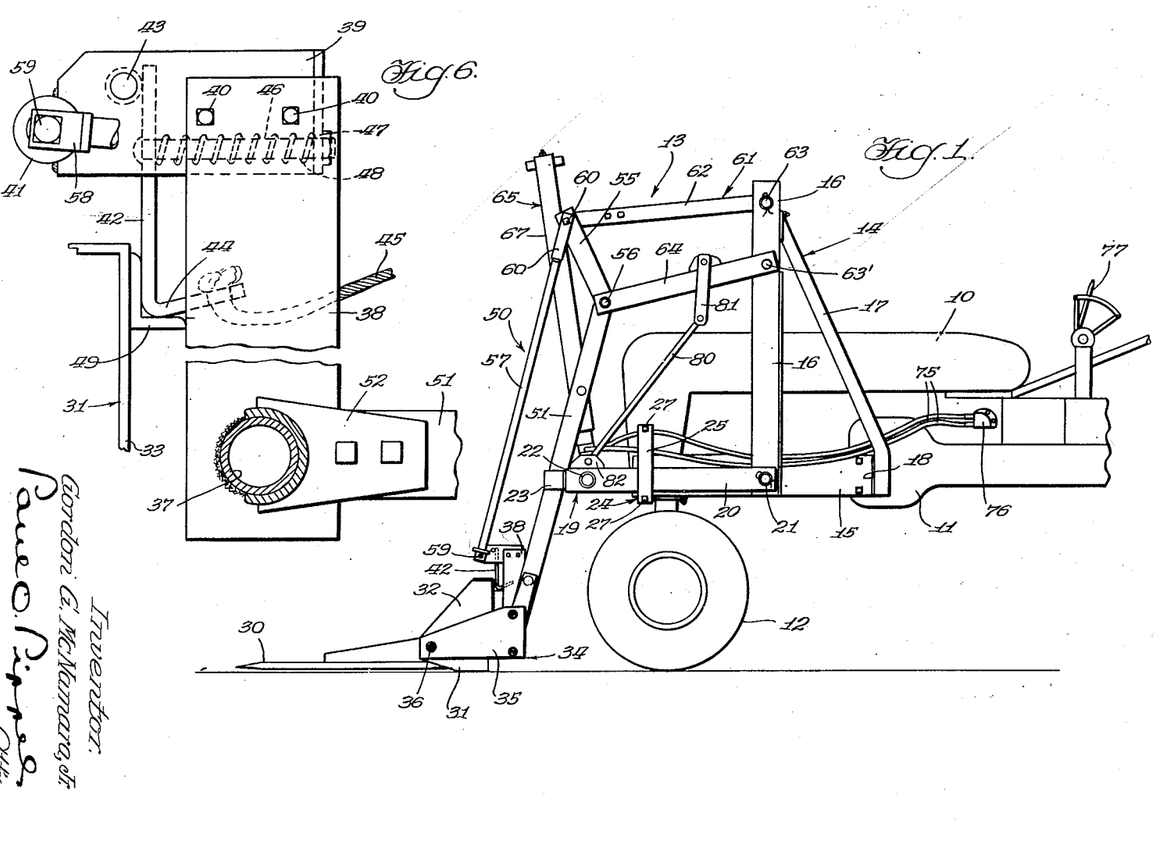
Fig. 1 is a side elevational view of a tractor having an improved type of loader attachment connected thereto, said view showing the loader shovel in an initial load engaging position.
Fig. 6 is a detail view partially in section taken along the line 6—6 of Fig. 4.
Figure 2:
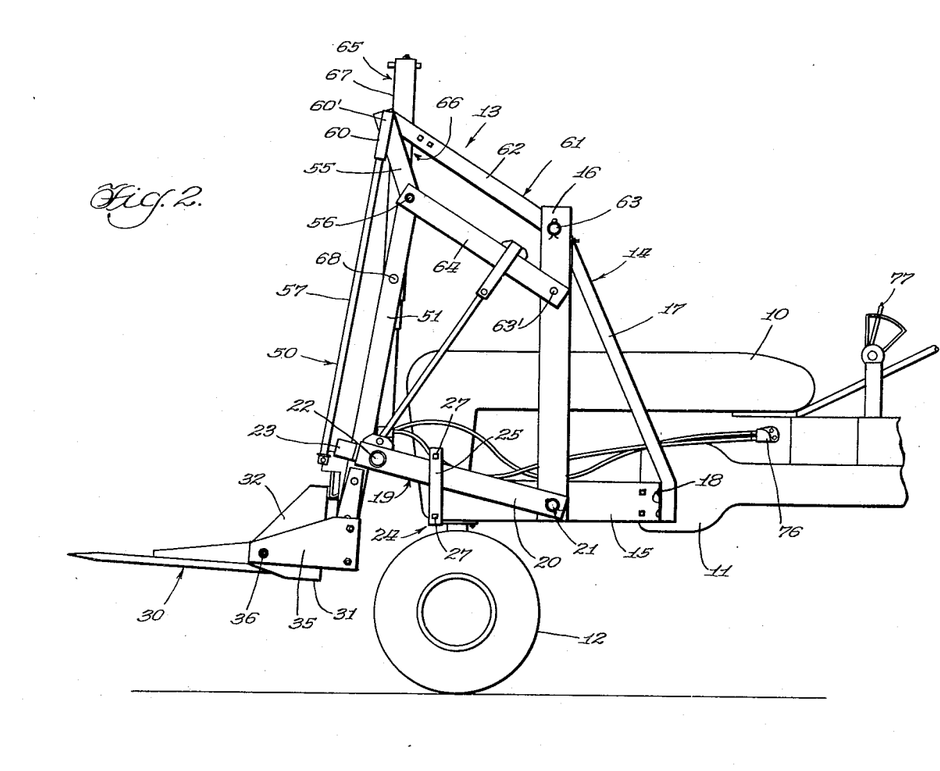
Fig. 2 is a view similar to Fig. 1 showing the loader shovel in a second stage of its cycle of operation.
Figure 3:
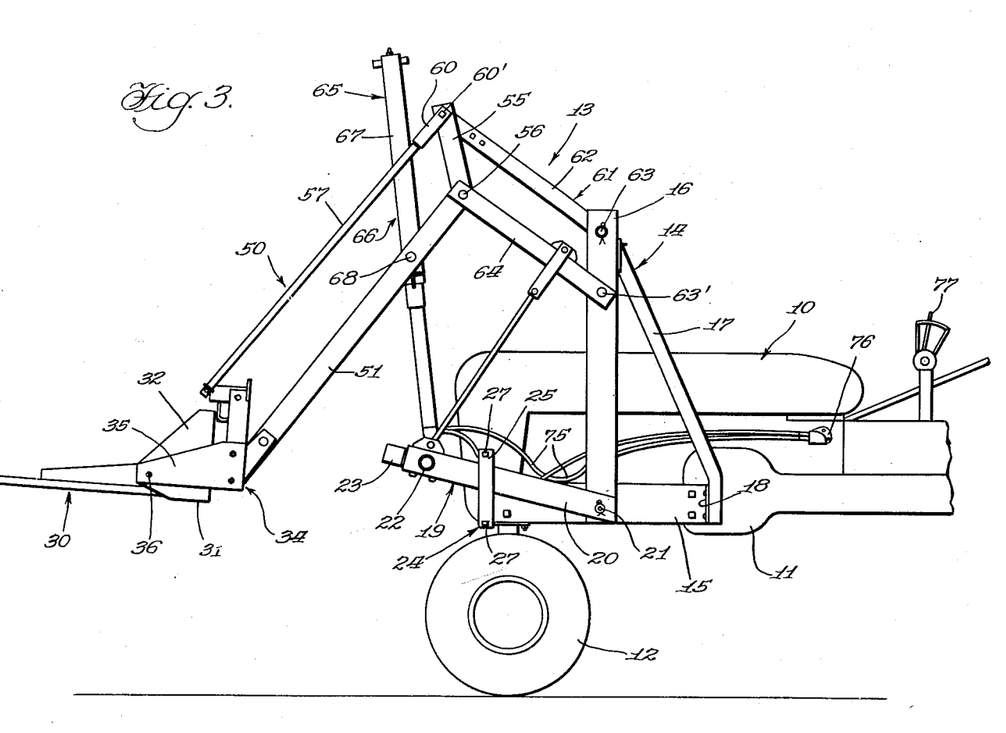
Fig. 3 is a view similar to Fig. 2 showing the loader shovel in a third stage of a cycle of operation.

A loading attachment is generally designated by the reference character 13. The loading attachment 13 is supported on the tractor 10 by means of a supporting structure 14. The supporting structure 14 consists of a pair of laterally spaced side members 15 as best shown in Figs. 1, 2 and 3. A pair of transversely spaced vertical supports 16 are suitably connected to the side members 15. The vertical supports 16 are rigidly secured to the supporting structure 14 by means of a pair of diagonal braces 17. A transverse strap 16' connects the vertical supports 16. The side members 15 are provided at their rearmost ends with a bent over portion 18 to which the diagonal braces 17 are securely connected. A horizontal frame 19 extends from the tractor outwardly from the front thereof. The frame 19 comprises a pair of transversely spaced horizontally extending members 20 which are pivotally connected, as indicated at 21, to the vertical supports 16. A torsion tube or bumper 22 extends transversely with respect to the frame 19 and is in turn rigidly secured to the horizontally extending members 20. The forward ends of the members 20 also include guide plates 23, the purpose of which will appear later. A vertical guide and stop member 24 is provided at each side of the tractor and each guide 24 comprises generally a pair of transversely spaced plates between which the horizontally extending members 20 may move. Spacers 26 suitably space the plate members 25, said spacers being rigidly secured to said members by means of transversely extending bolts 27. The horizontally extending members 20 are so arranged that they may move vertically within the plates, the spacers 26 acting as stop members in a manner that will appear later.

A loading mechanism in the form of a shovel or forked scoop is generally designated by the reference character 30. The shovel is positioned forwardly of the tractor and includes a heel portion 31 comprising a pair of laterally spaced side members 32 which are connected by means of a backing member 33. A shovel support 34 is designed to support the shovel 30, said support including a pair of transversely spaced plates 35. The shovel 30 is held between the plates 35 by means of pivotal pins 36 which permit the shovel to pivot about a transverse axis.

Figure 4:
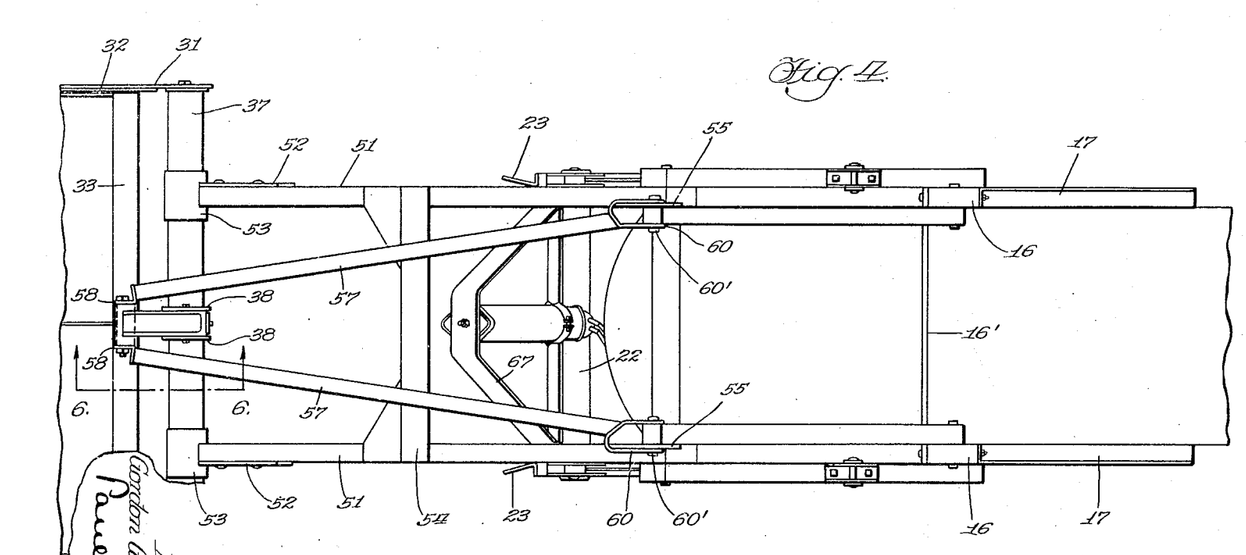
Fig. 4 is a plan view of the loader showing the stage of operation shown in Fig. 3.

As best shown in Figs. 4 and 6 a transversely extending torsion tube 37 rigidly secures the transversely spaced plates 35. As best shown in Fig. 6 a pair of vertically extending plates 38 are rigidly secured to the torsion tube 37. The plates 38 extend upwardly and have connected thereto a U-shaped bracket 39. The U-shaped bracket 39 is rigidly secured to the vertical plates 38 by means of bolts 40. The forward portions of the U-shaped bracket 39 are rigidly secured by means of a transversely extending short tubular portion 41. An L-shaped latch member 42 is pivotally connected within the U-shaped bracket 39 by means of a pivot pin 43. The L-shaped latch includes at its lower end a bent portion 44 to which a rope or cable 45 may be attached. A slide pin 46 extends through the latch 42 and through an opening 47 in the rear wall of the U-shaped bracket 39. A spring 48 encircles the slide pin 46 and normally urges the latch 42 into abutting engagement with an angle 49, said angle 49 being connected to the backing member 33 of the shovel 30.

A lifting frame is generally designated by the reference character 50. The lifting frame includes a first pair of transversely spaced lifting arms or members 51. Each lifting arm 51 is rigidly secured to a plate 52 that is in turn connected to a bearing sleeve 53. The bearing sleeves 53 are free to pivot about the torsion tube 37. A brace 54 extends transversely to rigidly secure the lifting arms 51. A pair of links 55 each have a pivotal connection with the lifting arms 51 as designated by the reference character 56. A second pair of lifting arms of members 57 are substantially parallel to the first pair of lifting arms 51 and converge in a downward direction to where they are pivotally secured by means of angle brackets 58 to the tube 41 which is secured to the U-shaped bracket 39. The pivotal connection is accomplished by means of a pivot bolt 59.

The upper ends of the members 57 are each provided with a U-shaped strap 60 which is pivotally connected to the upper end of each link 55 as indicated by the reference character 60'.

A pivot frame is generally designated by the reference character 61. The pivot frame includes a pair of transversely spaced upper pivot members 62 which are pivotally connected to the upper ends of the transversely spaced vertical support 16 by means of pivot pins 63. The forward ends of these pivot members 62 are pivotally connected to the links 55 and the members 57. The frame 61 also includes a pair of transversely spaced lower pivot members 64 which in turn are pivotally connected to the vertical support 16 by means of pivot pins 63'. The forward ends of the lower pivot members 64 are also pivotally connected by means of the pivotal connection 56 to the links 55 and the first pair of parallel lifting arms 51.

Figure 7:
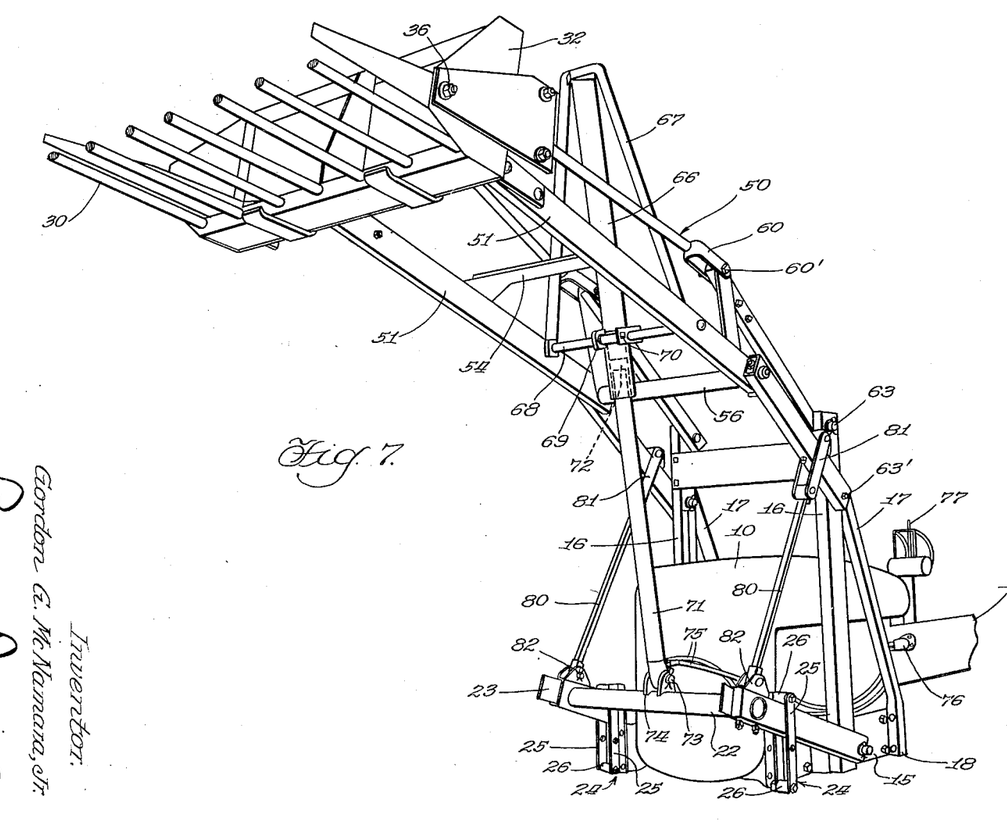
Fig. 7 is a perspective view showing the loader attachment lifted to a maximum lift position.
Figure 8:
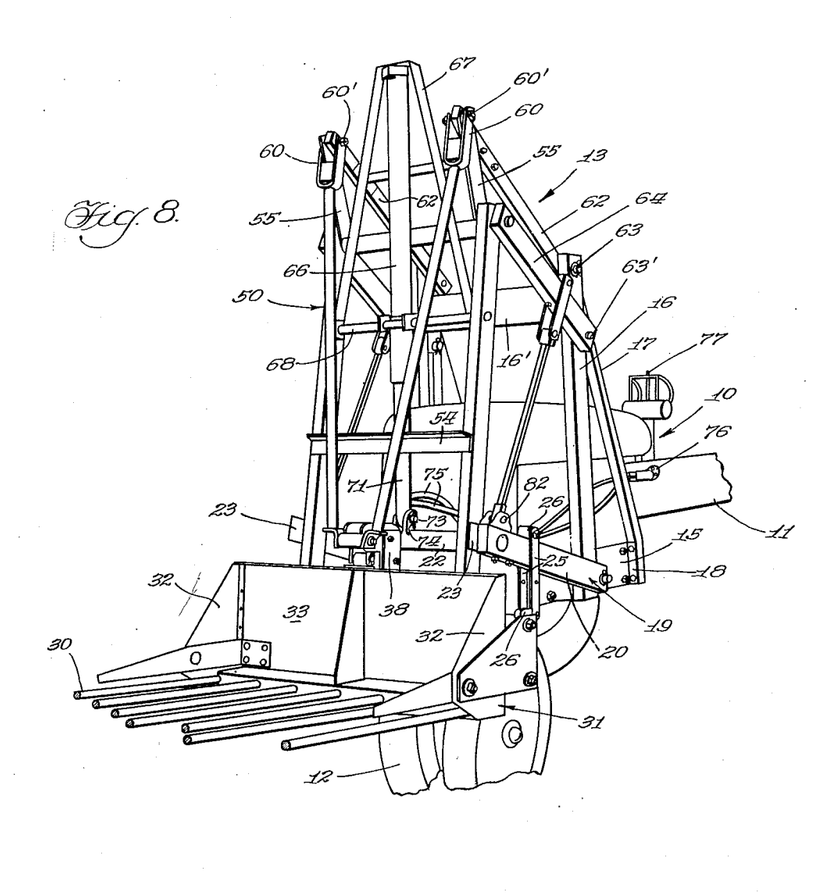
Fig. 8 is a perspective view of the loader and a portion of the tractor showing the loader shovel in a transport position.

The lifting frame 50 is actuated by means of a lifting mechanism or hydraulic ram generally indicated at 65. The ram 65 includes a hydraulic cylinder 66 which is connected at its upper end to a V-shaped tension frame 67. The tension frame 67 is connected at its lower end by means of a tubular cross member 68 to and between the lifting arms 51. A collar 69 as best shown in Fig. 7 rigidly connects the cylinder 66 to the rod 68. A bolt 70 connects the collar 69 about the outer periphery of the cylinder 66. A piston rod 71 is arranged to reciprocate within the cylinder 66. A piston 72 is connected to the end of the piston rod 71 for movement within the cylinder in a well-known manner. The lower end of the piston rod 71 is rigidly connected by means of a pin 73 and ears 74 to the torsion tube or bumper 22. Fluid conduits 75 are connected to the lower ends of the piston rod 71, the conduits extending rearwardly for connection at 76 to the longitudinal body 11 of the tractor. The conduits 75 may be in communication with a fluid pump of conventional design and it is not believed necessary to elaborate on this construction since any conventional form of fluid transmitting means may be utilized. The cylinder 66 is of a two-way type, also well-known to those skilled in the art and the reciprocation of the piston rod 71 within the cylinder may be controlled by means of a detent valve control 77 mounted on the tractor within the reach of the operator's station.

The stages in the operation of the loader attachment are best shown in Figs. 1, 2, 3 and 5.

In the position shown in Fig. 1 the scoop or shovel 30 is resting upon the ground. The operator drives the tractor up to a load which is to be moved. The tractor is moving forwardly as the scoop is carried at ground level. The forward force of the tractor causes the scoop 34 to be driven into the load. Under extreme conditions, in order to drive the scoop completely into the load the tractor may be operated in alternating forward and reverse movements, the butting action of the bumper 22 serving to drive the scoop 34 fully into the load or pile. After the scoop has fully penetrated, the next stage of the operation is to break the load free from the pile. In this stage the lifting frame 50 extends substantially vertically with respect to the tractor. As the ram 66 is operated the lifting arms 51 and the members 57 are bodily moved in a vertical direction, therefore also moving the scoop substantially vertically upwardly. This initial movement takes place while the shovel is positioned substantially close to and adjacent the front ground supports of the tractor. Therefore, the greatest stresses encountered by the shovel are initially supported close to the front wheels of the tractor. The maximum working efficiency of the cylinder is utilized during the initial stage of the operation when the shovel is broken loose from the ground.

Since there is little overhanging of the lifting frame with respect to the tractor, full traction is at all times maintained by the rear wheels of the tractor and after the load has thus been broken free of the pile the tractor can readily back up with its loaded shovel. The initial stage of operation therefore causes the shovel to move upwardly into the position shown in Fig. 2. The pivot frame 61 has moved a short distance upwardly about the pivotal connections 63 and 63' on the frame 14. By virtue of a pair of tension links 80 the horizontal frame 19 is also moved vertically. The tension links 80 are connected at their upper ends by means of transversely spaced straps 81 to the lower pivot members 64. The lower ends of the straps 81 are also pivotally connected by means of brackets 82 to the horizontally extending members 20 of the horizontal frame 19. In the initial stage of operation, therefore, these tension links serve to pivot the frame 19 whereby movement of said frame is in an upward direction.

In the position shown in Fig. 2 the horizontal members 20 have been pivoted upwardly until they have engaged the upper spacers 26 of the stop members 24. Upward movement of the frame 19 therefore is now halted. In this position the load may be transported with maximum safety.

Figure 5:
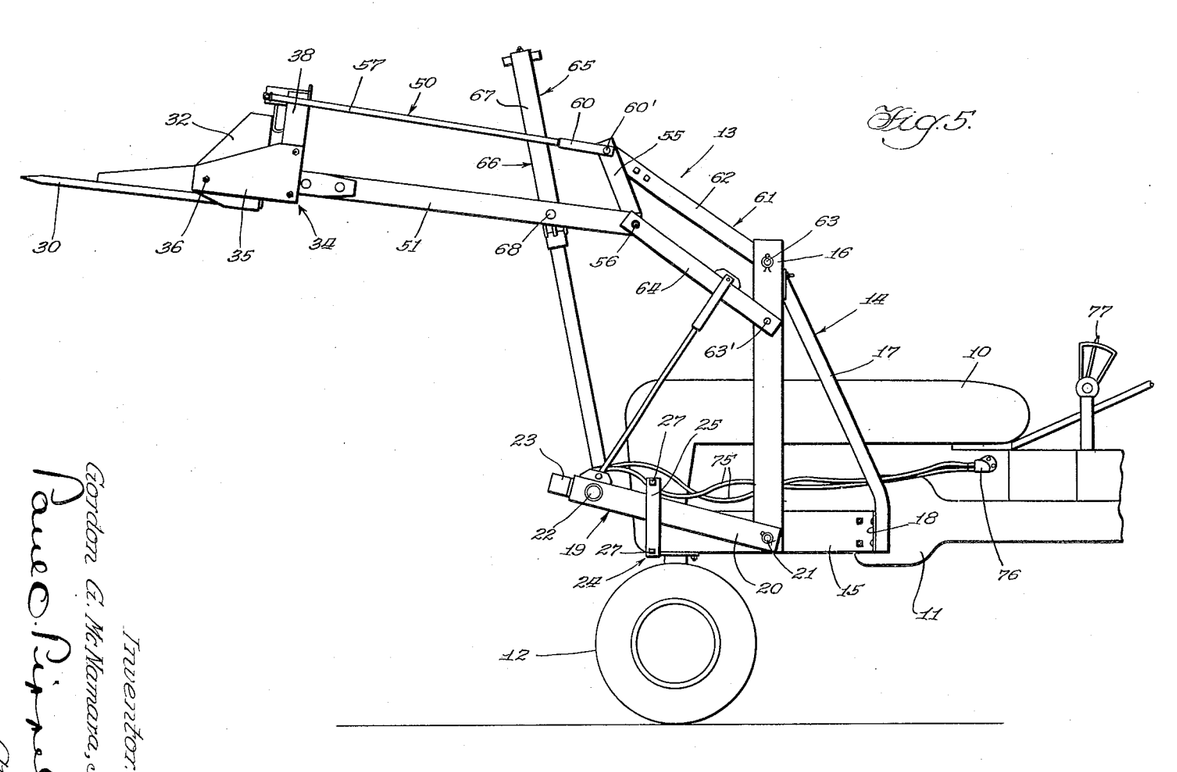
Fig. 5 is a view similar to Fig. 3 showing the loader shovel lifted to a maximum lift position.

When the operator wishes to dump the load into a wagon or other receptacle, he then may lift the shovel 30 to its extreme upward height. Continued actuation of the ram 66 is now effective to swing the lifting arms 51 and members 57 about the pivotal connections 56 and 60' on the pivot frame 61. The movement of the lower ends of the arms 57 and members 51 is such that the scoop 30 is moved in an outward and upwardly arcuate path. The movement of travel is best shown in Fig. 3 and the maximum height position of the loader is best shown in Figs. 5 and 7. The operator is now ready to tip the shovel for unloading the material carried thereon. He thereupon merely pulls on the cord 45 whereupon the latch member 42 is pivoted out of engagement with the angle 49 of the shovel. The shovel and the load are so balanced that the shovel is now free to pivot about the pivot pins 36 and the load is dumped. After the load is dumped the shovel automatically returns to its natural position since the rear end of the shovel is considerably heavier than the forward unloaded portion of the same.

The position shown in Fig. 2 is also characteristic of the transport operation of the loading mechanism. If it is desired to merely transport quantities of material from one section to the other, the operator keeps the shovel in the position shown in Fig. 2. Again it should be noted that the shovel in this position is immediately adjacent the front ground supports of the tractor. Therefore, the load can easily be transported in this position without the tractor losing any of its traction which the rear wheels supply. In this manner unfavorable ground conditions do not effect the transporting operation of the machine.

The unique and novel principle of operation brought forth is of prime importance in accomplishing the desired objects set forth above. Instead of a conventional overhanging boom type of construction applicant has provided a lifting frame 50 which is adapted to pivot on a pivot frame 61, the pivot frame 61 in turn being arranged to pivot on the supports provided on the tractor. The greatest loads and stresses encountered during the operation of the shovel will therefore be assumed by the tractor in close proximity to the front ground supports thereof.

With the novel linkage arrangement shown the piston ram is in its most favorable lifting position during the stages of operation shown in Figs. 1 and 2. It is during this break loose position that the greatest force is exerted and as previously mentioned the front end of the tractor can readily carry the load since the work is done immediately adjacent the front wheels. As the lifting frame and the scoop are moved outwardly and upwardly in an arcuate path as indicated in Fig. 3, the piston ram 66 is placed in a more unfavorable lifting position and its lifting ability rapidly decreases. For example the cylinder may exert a lifting force of 5000 pounds in the positions shown in Figs. 1 and 2. However, in subsequent stages of operation the cylinder may be so positioned that the lifting force will only lift a load of approximately 500 pounds at the shovel. This is an important safety feature since the unskilled operator will not be able to lift a load that will be detrimental to the front of the tractor when the shovel is being swung in its outward arcuate path and when the work load is distanced considerably from the front of the tractor. On the other hand however, the piston will respond to exert a maximum force when most desired, namely when the lifting frame is moving vertically close to and adjacent the front end of the tractor. The arrangement therefore clearly facilitates lifting and only a safe load can be lifted regardless of the skill and judgment of the operator.

As best shown in Fig. 1 the tension rods 80 are pivotally connected to the straps 81. Therefore, if it is desired to lower the shovel downwardly into depressions in the ground, and the horizontal members 20 are resting in their extreme lower position, the operator merely actuates the ram 66 so that it will move to its greatest collapsed position. The shovel may then be moved downwardly to a position lower than that shown in Fig. 1.

It is believed that the objects of the invention have been fully achieved by the loader construction disclosed and claimed. A novel light weight loader construction has been provided which will adequately and satisfactorily function regardless of the type of tractor utilized. It must be understood that changes and modifications may be made in this construction which do not depart from the spirit of the invention as disclosed nor the scope thereof as defined in the appended claims.

What is claimed is:

1. A loading attachment for a tractor comprising a supporting structure connected to the tractor; said supporting structure including a vertical support extending upwardly above the tractor; a horizontal frame extending forwardly of the tractor, said frame including a pair of longitudinal side members pivotally connected to the tractor, and a transversely extending beam connecting said side members; a shovel positioned forwardly of the tractor; a lifting frame including a pair of substantially parallel lifting arms pivotally connected to said shovel; said arms extending substantially vertically during a lowered position of said shovel; a link pivotally connecting the upper ends of said lifting arms; upper and lower spaced pivot members pivotally connected to said link and said lifting arms, said members extending rearwardly and being pivotally connected to said vertical support; a hydraulic ram pivotally connected to said lifting frame and to said horizontal frame; a tension link pivotally connected intermediate the ends of one of said pivot members; means pivotally connecting said link to said horizontal frame at a point remote from the pivoted connection of said horizontal frame and said tractor; said tension link limiting relative movement between the frame and said pivot members; means for actuating said hydraulic ram whereby said lifting arms and said shovel are moved initially vertically, one of said arms moving in sliding abutting relation with respect to said horizontal frame, said lower and upper pivot members also being moved upwardly thereby moving said horizontal frame upwardly; a stop connected to said tractor, said stop being adapted to engage said horizontal frame to limit the vertical movement thereof whereupon continued actuation of said hydraulic ram operates to pivot said lifting arms about their pivotal connections with said upper and lower pivot members whereby said shovel is moved in an outward and upward arcuate path.

2. A loading attachment for a tractor comprising a supporting structure connected to the tractor; a horizontal frame extending forwardly of the tractor, said frame including a pair of longitudinal side members pivotally connected to the tractor, a shovel positioned forwardly of the tractor; a lifting frame including a pair of substantially parallel lifting arms pivotally connected to said shovel; said arms extending substantially vertically during a lowered position of the shovel; upper and lower spaced pivot members pivotally connected to said lifting arms, said members extending rearwardly and being pivotally connected to said supporting structure; a link member pivotally connected to ends of the lifting arms and pivotally connected to ends of the pivot members; a hydraulic ram connected to said lifting frame and to said horizontal frame; a tension link pivotally connected intermediate the ends of one of said pivot members;

means pivotally connecting said tension links to said horizontal frame at a point remote from the pivotal connection of said horizontal frame to said tractor; means for actuating said hydraulic ram whereby said lifting arms and said shovel are moved initially vertically, one of said arms moving in abutting relation with respect to said horizontal frame, said lower and upper pivot members also being moved upwardly thereby moving said horizontal frame upwardly, a stop engageable with said horizontal frame to limit the vertical movement thereof whereupon continued actuation of said hydraulic ram operates to pivot said lifting arms about their pivotal connections with said upper and lower pivot members whereby said shovel is moved outwardly and upwardly with respect to the tractor.

3. A loading attachment for a tractor comprising a supporting structure connected to the tractor, said supporting structure including a vertical support; a horizontally extending frame pivotally connected to said tractor; a shovel positioned forwardly of the tractor; means connecting said shovel to said supporting structure including a lifting arm; a pivot member pivotally connected to said lifting arm and to said vertical support; a hydraulic ram connected to said lifting arm and to said horizontal frame; means for actuating said hydraulic ram thereby initially moving said lifting arm upwardly in abutting relation with said frame, thereby pivoting said pivot member; a tension link pivotally connected to said pivot member intermediate its ends and pivotally connected to said frame at a point remote from the pivotal connection of said horizontally extending frame to said tractor for moving said frame upwardly with said pivot member; a stop on said tractor for limiting the upward movement of said frame, said stop being engageable with the frame to limit upward movement of said pivot member, whereupon continued actuation of said hydraulic ram operates to pivot said lifting arm on said pivot member thereby moving the lower portion of said arm and said shovel outwardly and upwardly with respect to said tractor.

4. A loading attachment for a tractor comprising a supporting structure connected to the tractor, a horizontally extending frame pivotally connected to said tractor; a shovel positioned forwardly of the tractor; means connecting said shovel to said supporting structure including a lifting arm; a pivot member pivotally connected to said lifting arm and to said vertical support; a hydraulic ram connected to said lifting arm and to said horizontal frame; means for actuating said hydraulic ram thereby initially moving said lifting arm upwardly in abutting relation with said frame thereby pivoting said pivot member; a tension link pivotally connected to said pivot member intermediate its ends and pivotally connected to said frame at a point remote from the pivotal connection of said horizontal frame to said tractor for moving said frame upwardly with said pivot member; a stop supported on the tractor for limiting the upward movement of said frame, said stop being constructed and arranged to limit upward movement of said pivot member, whereupon continued actuation of said hydraulic ram operates to pivot said lifting arm on said pivot member thereby moving the lower portion of said arm and said shovel outwardly and upwardly with respect to said tractor.

5. A loading attachment for a tractor comprising a supporting structure connected to the tractor adjacent the front end thereof; said supporting structure including a vertical support; a frame connected to and extending longitudinally with respect to the tractor, said frame having a portion projecting forwardly of the tractor; a lifting arm positioned forwardly of the frame; said lifting arm extending substantially vertically and having a lower portion thereof in abutting relation with said projecting portion of the frame during an initial load engaging position; a shovel connected to the lower portion of said lifting arm for movement therewith; a pivot member pivotally connected to an upper portion of said lifting arm and extending horizontally rearwardly with respect thereto; said pivotal point of connection being disposed rearwardly of the abutting portion of the frame with the lifting arm; said pivot member being pivotally connected to said vertical support; a lifting mechanism pivotally connected to said lifting arm and to the frame; linkage means pivotally connected intermediate the ends of said pivot member and pivotally connected to said frame at a point remote from the pivotal connection of said frame to said tractor for limiting the relative movement between said frame and said pivot members; and a stop on said tractor engageable with the frame for limiting movement of said frame; said lifting mechanism being movable for moving said lifting arm and said pivot member whereby said lifting arm is moved initially vertically in abutting relation with respect to the projecting portion of said frame; and where, upon continued actuation of said lifting mechanism said frame is movable into engagement with said stop, said pivot member is held against movement by said linkage means and said lifting mechanism operates to pivot said lifting arm with respect to said supporting structure; thereby moving said lifting arm to a substantially longitudinal position and said shovel outwardly and upwardly with respect to said tractor.

GORDON G. McNAMARA, Jr.

References Cited in the file of this patent

UNITED STATES PATENTS

| Number | Name | Date |
|---|---|---|
| 1,561,694 | Clutter | Nov. 17, 1925 |
| 2,372,220 | Mork | Mar. 27, 1945 |
| 2,391,224 | Carter | Dec. 18, 1945 |
| 2,394,830 | Woodin | Feb. 12, 1946 |
| 2,398,119 | Sauder | Apr. 9, 1946 |
| 2,449,212 | Fraga | Sept. 14, 1948 |
| 2,468,201 | Hoover | Apr. 26, 1949 |
| 2,470,147 | Cramer | May 17, 1949 |
| 2,488,699 | Anthony | Nov. 22, 1949 |